(12) United States Patent
Boeke et al.

(10) Patent No.: US 12,167,517 B2
(45) Date of Patent: Dec. 10, 2024

(54) DRIVER FOR A LOAD, AS WELL AS A CORRESPONDING LIGHT EMITTING DIODE, LED, BASED LIGHTING DEVICE AND A METHOD

(71) Applicant: SIGNIFY HOLDING B.V., Eindhoven (NL)

(72) Inventors: Ulrich Boeke, Langerwehe (DE); Christian Hattrup, Wurselen (DE); Eugen Jacob De Mol, Eindhoven (NL); Machiel Antonius Martinus Hendrix, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/030,162

(22) PCT Filed: Sep. 30, 2021

(86) PCT No.: PCT/EP2021/076979
§ 371 (c)(1),
(2) Date: Apr. 4, 2023

(87) PCT Pub. No.: WO2022/073848
PCT Pub. Date: Apr. 14, 2022

(65) Prior Publication Data
US 2023/0371148 A1 Nov. 16, 2023

(30) Foreign Application Priority Data
Oct. 8, 2020 (EP) ...................................... 20200812

(51) Int. Cl.
| | | |
|---|---|---|
| H05B 45/30 | (2020.01) | |
| H05B 45/355 | (2020.01) | |
| H05B 45/375 | (2020.01) | |
| H05B 45/38 | (2020.01) | |

(52) U.S. Cl.
CPC ........... *H05B 45/38* (2020.01); *H05B 45/355* (2020.01); *H05B 45/375* (2020.01)

(58) Field of Classification Search
CPC .... H05B 45/38; H05B 45/355; H05B 45/375; H05B 45/385; H05B 45/395; H02M 1/4208; H02M 1/4225; H02M 1/4241
See application file for complete search history.

(56) References Cited

U.S. PATENT DOCUMENTS

| | | | |
|---|---|---|---|
| 7,327,124 B2 | 2/2008 | Liu et al. | |
| 10,003,248 B1* | 6/2018 | Malinin | ............ H02M 3/33576 |
| 2011/0260631 A1* | 10/2011 | Park | ....................... H05B 45/39 |
| | | | 315/165 |

(Continued)

*Primary Examiner* — Tung X Le

(57) ABSTRACT

A driver for driving a load, wherein the driver comprises a dual-boost converter comprising an output capacitance comprising a first output capacitor connected in series with a second output capacitor, a first switch connected to a power input stage via a first inductor and arranged for controlling charging of said first output capacitor via a first diode and a second switch, connected in series with said first switch, and connected to the power input stage via a second inductor and arranged for controlling charging of said second output capacitor via a second diode; wherein a centre tap of said in series connected first and second output capacitor is connected to a centre tap of said in series connected first and second switch.

12 Claims, 2 Drawing Sheets

(56) References Cited

U.S. PATENT DOCUMENTS

| | | |
|---|---|---|
| 2011/0309817 A1 | 12/2011 | Yun et al. |
| 2012/0262144 A1* | 10/2012 | Lyons ................ H05B 45/3725 |
| | | 323/311 |
| 2014/0239810 A1* | 8/2014 | Martin-Lopez .... H05B 45/3725 |
| | | 315/85 |
| 2015/0289331 A1* | 10/2015 | Chen ...................... H05B 45/39 |
| | | 315/186 |
| 2015/0357912 A1* | 12/2015 | Perreault ........... H02M 3/33569 |
| | | 363/126 |
| 2016/0029451 A1* | 1/2016 | Schijffelen ............. H05B 45/38 |
| | | 315/193 |
| 2016/0079872 A1* | 3/2016 | Ryu ...................... H02M 3/156 |
| | | 363/21.04 |
| 2016/0094142 A1 | 3/2016 | Mahdavikhah et al. |
| 2017/0062876 A1* | 3/2017 | Narla .................... B60L 3/0046 |
| 2021/0267035 A1* | 8/2021 | Han .................... H05B 45/325 |

* cited by examiner

DRIVER FOR A LOAD, AS WELL AS A CORRESPONDING LIGHT EMITTING DIODE, LED, BASED LIGHTING DEVICE AND A METHOD

CROSS-REFERENCE TO PRIOR APPLICATIONS

This application is the U.S. National Phase application under 35 U.S.C. § 371 of International Application No. PCT/EP2021/076979, filed on Sep. 30, 2021, which claims the benefit of European Patent Application No. 20200812.4, filed on Oct. 8, 2020. These applications are hereby incorporated by reference herein.

TECHNICAL FIELD

The present disclosure generally relates to the field of drivers. Specifically, it relates to an improved driver which allows for lower voltage rated components to be used.

BACKGROUND

Drivers may be available with a design specification for medium (120-240 V) to high (up to around 400V) alternating current, AC, mains voltage, for driving a load e.g. one or more light sources such as Light Emitting Diodes, LEDs, or High Intensity Discharge, HID, light sources.

These drivers may typically comprise two series-connected power converter stages, namely a first power converter stage for Power Factor Correction, PFC, and a second power converter stage for controlling AC or DC in the load, i.e. direct current, DC, for LED; alternating current, AC, for HID. The first power converter stage may typically comprise a boost converter in order to generate a DC output voltage higher than its input voltage, e.g. a 650 V DC output voltage, to serve as a supply voltage to the load.

Certain electronic components have a maximum rated voltage. For example, gallium nitride, GaN, semiconductors may have a maximum rated voltage of, for example, 600-650 V. Such semiconductors may therefore not be applied in a power converter stage that operates with a 650 V DC voltage. This may especially be the case when taking into account de-rating of components in order to satisfy certain constraints or desires, e.g. an extended lifetime, or in case of temporary mains fluctuations caused by e.g. lightning strikes.

SUMMARY

It is a desire of the inventors to safely apply such electronic components in a driver. In particular, it is an insight of the inventors to make the output voltage of the boost converter safe for components limited to a maximum rated voltage, by providing a reduced voltage to the involved components, thus respecting the maximum rated voltage.

Accordingly, according to a first aspect of the invention, there is provided a driver for driving a load. The driver comprises a dual-boost converter. The dual-boost converter comprises an output capacitance comprising a first output capacitor connected in series with a second output capacitor. The dual-boost converter also comprises a first switch connected to a power input stage via a first inductor and arranged for controlling charging of said first output capacitor via a first diode. The dual-boost converter also comprises a second switch connected in series with said first switch. The second switch is also connected to the power input stage via a second inductor and is arranged for controlling charging of said second output capacitor via a second diode. A centre tap of said in series connected first and second output capacitor is connected to a centre tap of said in series connected first and second switch.

By providing two series-connected output capacitors and two corresponding series-connected switches, the voltage provided to specific components may be reduced compared to a situation wherein only a single output capacitor and corresponding switch is used. This allows the driver to respect the maximum rated voltage of those specific components. In other words, the voltage may be reduced significantly, e.g. halved, thus allowing the safe application of such components.

The bus voltage, for example 600 V DC or 650 V AC may not be reduced by the driver in accordance with the present disclosure. The bus voltage is, however, split over the components that are placed in series, such that the bus voltage is not across a single component that has a relatively low maximum rated voltage.

As used herein, a dual-boost converter comprises two boost converters. A boost converter, also known as a step-up converter, is a DC to DC, DC-DC, converter with an output (load) voltage greater than its input (supply, or source) voltage.

As used herein, a centre tap of two components is any node defining a point between those two components, such that each of those two components is connected to that point. In other words, a centre tap of components A and B may at the same time be a centre tap of components C and D, if each of components A, B, C and D is connected to that centre tap.

In some embodiments, wherein the second power converter stage comprises a plurality of power converters that are supplied from the dual-boost converter, the driver may have the problem of discharging the first and second output capacitors in the dual-boost converter unequally, since power levels of the respective power converters of the second power converter stage may not be exactly or approximately equal, even if the set point of those power converters is equal. This discharging may lead to an asymmetry of voltages over the first and second output capacitors, which may in turn lead to one or more of those voltages exceeding a maximum rated voltage of one or more of the components, e.g. electrolytic capacitors or GaN-based components, which may damage the driver.

The inventors have therefore additionally desired to even further improve the lifespan of drivers. It is an additional insight of the inventors to prevent unequal discharging of the first and second output capacitors in order to prevent exceeding maximum rated voltages of components of the driver.

Accordingly, in a particularly preferred embodiment, the driver comprises a controller arranged for controlling said first and second switch for balancing voltages over the first output capacitor and the second output capacitor, such that said voltages approach each other.

In this manner, it can be ensured that the voltage over each of the first and second output capacitors remains within a desired range of operation.

Thus, the particularly preferred embodiment is based on the idea of ensuring that the voltage over the first output capacitor and the voltage over the second output capacitor remain substantially equal, thus dividing the total boosted voltage of the dual-boost converter in such a manner that each separate voltage over the first and second output capacitors remains sufficiently low such that low rated (voltage) components, like Gallium-Nitride, GAN, power semiconductors, may be used.

It is noted that the controller may control the first and second switch by providing these switches with a particular control signal, wherein the duty cycle of the control signal determines the operating characteristics of the corresponding boost converter.

The controller may thus amend each of the duty cycles of the control signals that are provided to the first and the second switches.

In an embodiment, the controller is arranged for controlling the first and second switch in such a manner that a voltage on said centre tap is controlled to a predefined voltage level.

As used herein, given that the centre tap of the series-connected first and second output capacitors is connected to the centre tap of the series-connected first and second switch, both centre taps are either directly connected or are the same node, and are thus at the same voltage.

In this manner, it can be ensured that the voltage over each of the first and second output capacitors remains within a predictable range of operation.

In an embodiment, said driver further comprises a first DC-DC converter arranged for converting a voltage present over said first capacitor to an output voltage for driving a first load. The driver also comprises a second DC-DC converter arranged for converting a voltage present over said second capacitor to an output voltage for driving a second load. In this manner, at least two loads may be driven by the driver.

In an embodiment, an output of said first load is connected to said centre tap of said in series connected first and second output capacitor.

In this manner, it is assured that the first load drains power from the first capacitor and the second load drains power from the second capacitor.

In a specific embodiment, said controller is further arranged for receiving a first measurement being a measure for an amount of power consumed by, for example a voltage over, said first load, and for receiving a second measurement being a measure for an amount of power consumed by, for example a voltage over, said second load, and said controller is arranged for controlling said first and second switch based on said received first and second measurement.

In this manner, voltage may be balanced in a straightforward way.

In a further developed embodiment, said controller is further arranged for receiving a first measurement being a measure for an amount of current passing through said first load, and for receiving a second measurement being a measure for an amount of current passing through said second load, and said controller is arranged for controlling said first and second switch based on said receiving first and second measurement. It is to be noted that using measures for the amounts of current preferably in addition to the above described measures for the amounts of power consumed may advantageously improve the quality of the controlling, e.g. with a better response speed and/or better over/undershoot.

In an embodiment, the controller is further arranged for controlling the first and second switch at a first duty cycle and for controlling the first and second DC-DC converter at a second duty cycle, wherein the first duty cycle is either higher or lower than the second duty cycle. The operating frequency of the first and second DC-DC converters is preferably equal, but their starting phases may differ.

In an example, the controller is even further arranged for controlling the first and second switch at a first operating frequency, and for controlling the first and second DC-DC converter at a second operating frequency, wherein the first operating frequency is either higher than, lower than, or equal to the second operating frequency.

In this manner, the driver may optimize the required size of the inductors L1 and L2.

In a further considered embodiment, the operating frequency is synchronized to a main supply frequency of the driver, preferably being an integer multiple of said main supply frequency.

In this manner, the duty cycle of the operating frequency may be made proportional to the instantaneous mains amplitude, in order to mitigate electromagnetic interference.

In an embodiment, at least one of the first and second DC-DC converters comprises a gallium nitride, GaN, semiconductor.

In this manner, size and cost may be reduced compared to drivers containing semiconductors made of conventional materials.

In a further developed embodiment, the at least one of the first and second DC-DC converters comprising the GaN semiconductor is operable at a frequency of at least 150 kHz, preferably higher than 300 kHz, most preferably higher than 1 MHz.

In this manner, size requirements of electronic components of the driver may be reduced to smaller sizes, which may lead to lower costs.

In an embodiment, the dual-boost converter is further configured to perform power factor correction.

In this manner, circuitry of the boost converter may be used more efficiently.

In an embodiment, the dual-boost converter is arranged to boost an input voltage of said power input stage to at least 640 V DC.

In this manner, high power loads may be supplied.

Further, according to another aspect of the invention, there is provided a Light Emitting Diode, LED, based lighting device arranged for emitting light, wherein said LED based lighting device comprises a driver of any one of the embodiments as described above.

The skilled person will understand that considerations and advantages applying to the driver will apply mutatis mutandis to the lighting device.

In an embodiment, said first and said second load are LED based loads.

In this manner, convenience may be increased in terms of power consumption and lifetime.

In a further developed embodiment, said LED based loads are heterogeneous loads.

In this manner, more diverse loads may be selected.

Further, according to another aspect of the invention, there is provided a method of operating a driver in accordance with any of the embodiments as described hereinabove and at least comprising the controller as described hereinabove. The method comprises the step of controlling, by said controller, said first and second switch for balancing voltages over the first capacitor and the second capacitor, such that said voltages approach each other.

It is noted that, in accordance with the present disclosure, the voltage over the first capacitor and the voltage over the second capacitor do not necessarily have to be equal. According to the present disclosure, the voltage over these capacitors may differ with a predefined headroom voltage. In such a case, the controller may not actively try to equalize the two voltages. The controller may start operating, i.e. may start balancing the voltages, once the difference between the two voltages exceeds the predefined headroom voltage. The predefined headroom voltage may, for example, be 20% of the nominal rated voltage of the capacitor.

The skilled person will understand that considerations and advantages applying to the driver will apply mutatis mutandis to the lighting device.

BRIEF DESCRIPTION OF THE DRAWINGS

Exemplifying embodiments will now be described in more detail, with reference to the following appended drawings.

DESCRIPTION

Figure 1:
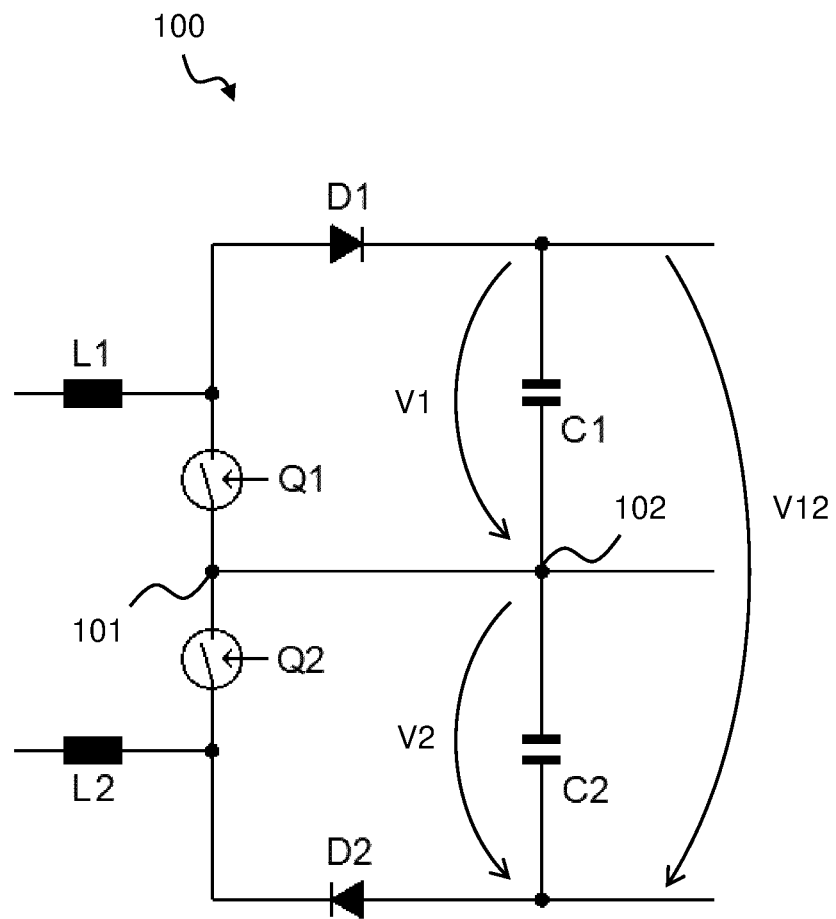
FIG. 1 schematically illustrates an electrical scheme of a driver according to some embodiments.

Drivers for driving a load such as an LED or HID, may be specified for single-phase or three-phase AC mains voltage, typically 347 V, 400 V or 480 V AC mains. Example applications for these drivers may be in luminaires, in particular in horticulture applications. These drivers may typically comprise two series-connected power stages, where the first power input stage may often comprise a boost converter for power factor correction (PFC) and total harmonic distortion (THD) control. Thus, the boost converters may generate a controlled DC output voltage of e.g. 650 V or even 678 V DC that is higher than the amplitude of the maximum AC mains voltage. The second stage may be arranged to control an AC current in a HID lamp or a DC current of a LED luminaire. This second stage may have the same high DC voltage rating.

Thus, new and advanced power Gallium-Nitride (GaN) power semiconductors with a maximum rated voltage of typically 600 V or 650 V cannot straightforwardly be used in a single DC-DC converter powered from a 650 V DC bus voltage, taking the necessary voltage derating for a long product lifetime into account.

The present disclosure relates to the second stage of such a driver. In short, a 650 V DC bus voltage may be divided in two times 325 V DC by having two series-connected output capacitors at the output of the dual-boost converter. Further, each output capacitor of the dual-boost converter may supply a DC-DC converter and load. In this way, the two series-connected DC-DC converters may divide the input voltage and power stress by two. This may allow the use of e.g. new GaN power semiconductors. Using GaN power semiconductors is advantageous, because it allows increasing the switching frequency considerably for miniaturization purposes. Further, due to reduced parasitics, GaN power semiconductors feature reduced switching losses. Each DC-DC converter may control the power in one group of LEDs.

However, this arrangement may have the problem of discharging the two series-connected supply voltage capacitors unequally since the power levels of two DC-DC converters are never perfectly the same, even if the set point is identical. This may lead to an imbalance (asymmetry) of the voltages across the two series-connected capacitors with the risk of exceeding the maximum rated voltages of components (e.g. electrolytics, GaN power devices), in turn potentially damaging the driver.

The problem above may be solved by a combination of two power control loops. The first local power control loop may have the same reference control value to regulate the load power of each DC-DC converter to the same nominal value. These loads may for example be a group of LEDs.

The second power control loop may control a power difference between both DC-DC converters such that the two series connected supply voltages $V_{DC1}$ and $V_{DC2}$ approach each other and are loaded with the same or approximately the same power levels. In this way the second power control loop may compensate unequal power levels due to e.g. component tolerances or unequal temperatures that may occur in case of LEDs to different power consumption.

FIG. 1 schematically illustrates an electrical scheme of a driver 100 according to some embodiments. The driver 100 is suitable for driving a load (not shown). The driver 100 comprises a dual-boost converter comprising an output capacitance comprising a first output capacitor C1 connected in series with a second output capacitor C2; a first switch Q1 connected to a power input stage (not shown) via a first inductor L1 and arranged for controlling charging of said first output capacitor Q1 via a first diode D1; a second switch Q2, connected in series with said first switch Q2, and connected to the power input stage via a second inductor L2 and arranged for controlling charging of said second output capacitor C2 via a second diode D2; wherein a centre tap 102 of said in series connected first C1 and second C2 output capacitor is connected to a centre tap 101 of said in series connected first Q1 and second Q2 switch. As can be seen in the figure, voltage V12 is present over the first output capacitor C1 and the second output capacitor C2 connected in series, and voltages V1 and V2 are respectively present over the first output capacitor C1 and the second output capacitor C2.

In this example, the advantage of safer operation applies to the first Q1 and second Q2 switch and the first C1 and second C2 output capacitor themselves, but the same advantage of safer operation may also apply to other components (not shown in the figure) connected to node 102.

Figure 2:
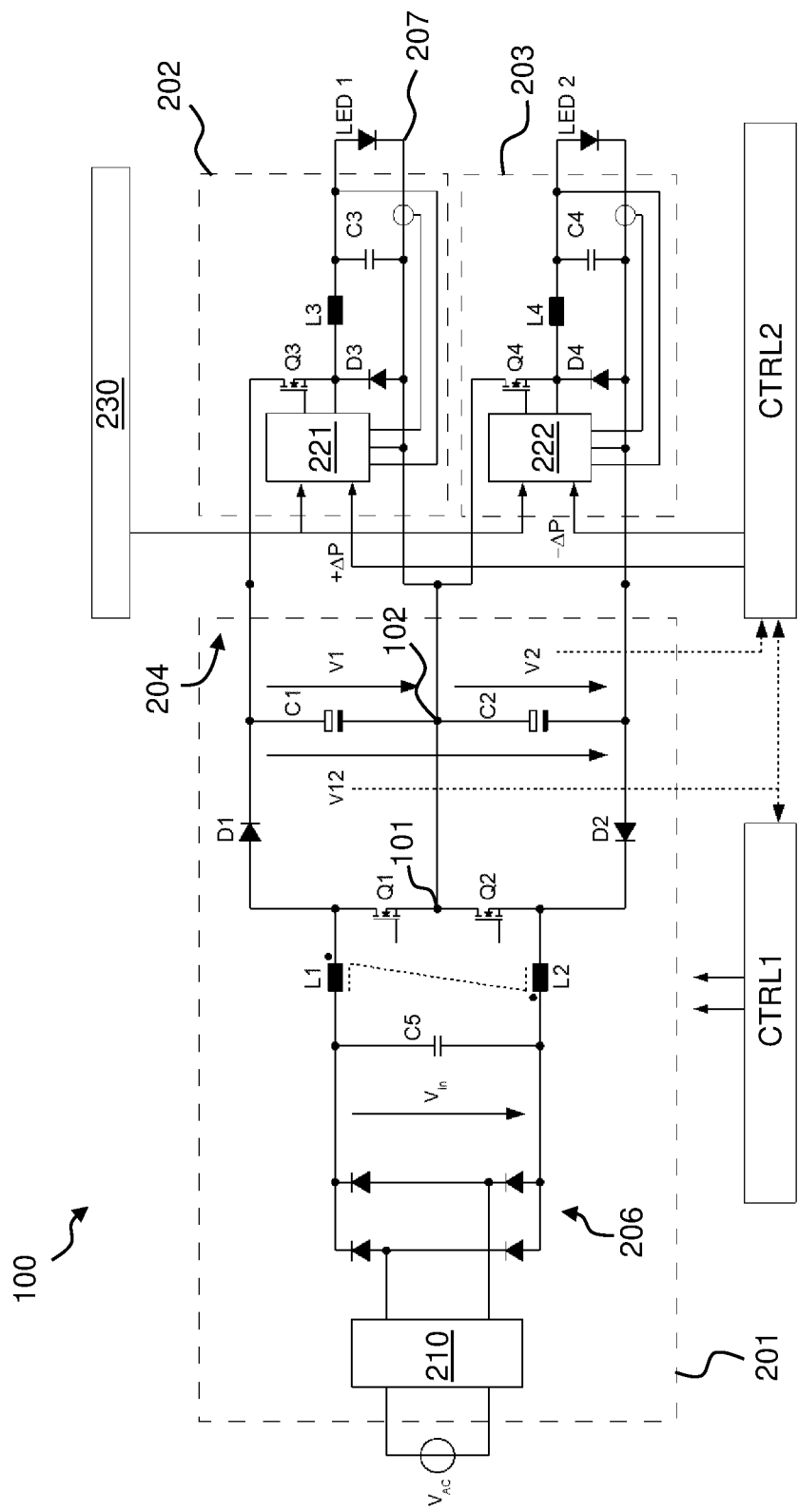
FIG. 2 schematically illustrates an electrical scheme of a driver according to some embodiments.

FIG. 2 schematically illustrates an electrical scheme of a driver 100 according to some embodiments.

The components of driver 100 as illustrated in FIG. 1 are also present in driver 100 as illustrated in FIG. 2, and are denoted with the same numerals and references.

Furthermore, FIG. 2 also illustrates under grouping 201 a power input stage and a dual-boost converter (having an output side 204 over capacitors C1 and C2), supplied from mains voltage $V_{AC}$. The voltage $V_{AC}$ is supplied to the power input stage comprising an EMC filter 210 and to a rectifier comprising a group of diodes 206 and a capacitor C5, in order to provide power factor correction. In this sense, the dual-boost converter is configured to perform power factor correction. In other words, the grouping 201 comprises an AC-DC power factor correction converter that rectifies an AC mains voltage $V_{AC}$ into a controlled DC output voltage $V_{DC}$. It is to be noted that power factor correction is not deemed essential to operation of the driver 100.

The dual-boost converter is a dual boost converter in the sense that it comprises two (or more) boost converters, namely a first boost converter comprising inductor L1, switch Q1, diode D1 and capacitor C1, and a second boost converter comprising inductor L2, switch Q2, diode D2 and capacitor C2.

Switches Q1 and Q2 are illustrated here as N-type metal-oxide-semiconductors, nMOS, but may be of any suitable type. The same applies for switches Q3 and Q4. Switches Q1 and Q2 may be controlled with gate pulses from a controller, namely CTRL1, analogously to operation of a single switch in known boost converters.

Furthermore, FIG. 2 also illustrates a first DC-DC converter 202, in this case a buck converter, and a second DC-DC converter 203, in this case also a buck converter. The first DC-DC converter 202 is arranged for converting voltage V1 present over the first output capacitor C1 to an output current for providing to a first load, denoted here LED1. The second DC-DC converter 203 is arranged for converting voltage V2 present over the second output capacitor C2 to an output current for providing to a second load, denoted here LED2. In this particular example, the first load is a LED and is thus denoted LED1, and the second load is also a LED and is thus denoted LED2. It is to be understood that LED1 may also comprise a group of LEDs, and that additionally or alternatively LED2 may also comprise a group of LEDs. Moreover, the first load and the second load may also be of another type, for example, HID lamps, mutatis mutandis.

Other DC-DC converters like a resonant converter (LLC, LCC) may be used instead of the buck converter.

The first DC-DC converter 202 as illustrated here comprises diode D3, inductor L3 and capacitor C3, as well as local power controller 221 operating switch Q3. Analogously, the second DC-DC converter 203 as illustrated here comprises diode D4, inductor L4 and capacitor C4, as well as local power controller 222 operating switch Q4. Local power controller 221 and 222 may be provided with a nominal power level 230, for example from lighting controls according to Digital Illumination Interface Alliance (DiiA) standards, such as Digital Addressable Lighting Interface (DALI) or Sensor-Ready (SR), in order to control power (or current) levels in LED1 and LED2 as desired. In this manner, the power per DC-DC converter may be controlled to a set point.

The details of the arrangement of these components within the respective DC-DC converter are left to the skilled person, noting that in this example DC-DC converters are used in order to cooperate with corresponding LED loads.

DC-DC Converter 202 and DC-DC Converter 203 may have input capacitors C1 and C2 of the same or approximately the same value, for example within 95%. In this case, the equal impedance of both capacitors divides the output voltage of the PFC converter front-end into two equal DC voltages. These input voltages of the two DC-DC converters are equal only at the beginning of the operation. After that these two capacitors are charged by the one output current of the PFC converter front-end and discharged individually by the input currents of each DC-DC converter.

In this example, as in the example of FIG. 1, the advantage of safer operation applies to the first Q1 and second Q2 switch and the first C1 and second C2 output capacitor themselves, but the same advantage of safer operation may also apply to other components connected to node 102, such as DC-DC Converter 202 and DC-DC Converter 203.

In FIG. 2 it is also illustrated according to a further developed embodiment that an output 207 of the first load LED1 is connected to the centre tap 102 of the series-connected first C1 and second C2 output capacitor.

In some embodiments, as illustrated here, a second controller CTRL2 is present to control $V_{DC2}=V_{DC}/2$, in this example by slightly manipulating the set point by adding or subtracting $\Delta P$ for the DC-DC converters 202, 203 such that the two supply voltages of DC-DC converter 202 and DC-DC converter 203 approach each other or, ideally, are the same.

In particular embodiments, the controller may be arranged for controlling said first and second switch for balancing voltages over the first output capacitor and the second output capacitor, such that said voltages approach each other to a predefined voltage ratio. Said predefined voltage ratio may be expressed as at least one of said voltages divided by the sum of said voltages. In other words, the respective voltages V1 and V2 may be balanced to a different voltage ratio than 50%-50% respectively, for example to a voltage ratio of 60%-40% respectively (or vice versa). In this case, the controller may e.g. balance voltage V1 to 60% of voltage V12 and voltage V2 to 40% of voltage V12 (or vice versa), which may still allow for safe application of some components. Any other voltage ratio value within the range of 40% to 60% may also be used.

In practical embodiments, the presence of the insights of the present disclosure can be tested by applying an asymmetric load and by measuring the voltage $V_{DC2}$ between the first C1 and second C2 capacitors.

In a particular embodiment, feedforward, instead of feedback, may advantageously be used for tubular LEDs, TLED, when two or more TLEDs are connected in series to mains.

In an embodiment, a main supply of the driver is three-phase, connected through a three-phase rectifier bridge.

In this manner, the output power of the converter may be raised above 3000 W, which is usually the limit for a single-phase converter.

In an embodiment, the driver comprises at least one additional capacitor connected in series to the first and second capacitors. The driver also comprises at least one respective additional power converter connected in series to the first and second power converters and connected in parallel to each respective additional capacitor.

In this manner, even greater numbers of loads may be supplied. In a particular embodiment, three capacitors and three respective power converters may be provided for three (groups of) loads, advantageously to drive separate (groups of) colours, e.g. red, green and blue (groups of) light sources.

The invention claimed is:

1. A driver for driving a first load and a second load, wherein the driver comprises:
   a dual-boost converter comprising:
      an output capacitance comprising a first output capacitor connected in series with a second output capacitor;
      a first switch connected to a power input stage via a first inductor and arranged for controlling charging of said first output capacitor via a first diode;
      the first inductor and the first diode;
      a second switch connected in series with said first switch and connected to the power input stage via a second inductor and arranged for controlling charging of said second output capacitor via a second diode;
      the second inductor and the second diode;
   wherein a center tap of said in series connected said first output capacitor and said second output capacitor is connected to a center tap of said in series connected said first switch and said second switch,
      wherein the driver further comprises:
      a first DC-DC converter arranged for converting a voltage present over said first output capacitor to a first output current for providing to the first load; and
      a second DC-DC converter arranged for converting a voltage present over said second output capacitor to a second output current for providing to the second load, wherein the first DC-DC converter is connected across the first output capacitor and wherein the second DC-DC converter is connected across the second output capacitor.

2. The driver in accordance with claim 1, wherein said driver further comprises:
a controller arranged for controlling said first switch and said second switch for balancing voltages over the first output capacitor and the second output capacitor, such that said voltages approach each other.

3. The driver in accordance with claim 2, wherein the controller is arranged for controlling a voltage on said center tap to a predefined voltage level.

4. The driver in accordance with claim 2, wherein said controller is further arranged for receiving a first measurement being a measure for an amount of current passing through said first load, and for receiving a second measurement being a measure for an amount of current passing through said second load, and wherein said controller is arranged for controlling said first switch and said second switch based on said received first measurement and said received second measurement.

5. The driver in accordance with claim 4, wherein the controller is further arranged for controlling the first switch and the second switch at a first duty cycle and for controlling the first DC-DC converter and the second DC-DC converter at a second duty cycle, wherein the first duty cycle is higher or lower than the second duty cycle.

6. The driver in accordance with claim 1, wherein an output of said first load is connected to said center tap of said in series connected said first output capacitor and said second output capacitor.

7. The driver in accordance with claim 1, wherein at least one of the first and second DC-DC converters comprises a gallium nitride, GaN, semiconductor.

8. The driver in accordance with claim 7, wherein the at least one of the first and second DC-DC converters comprising the GaN semiconductor is adapted to be operated at a frequency of at least 150 kHz.

9. The driver of claim 1, wherein the dual-boost converter is further configured to perform power factor correction.

10. The driver in accordance with claim 1, wherein the dual-boost converter is arranged to boost an input voltage of said power input stage to at least 640 V DC.

11. A Light Emitting Diode, LED, based lighting device arranged for emitting light, wherein said LED based lighting device comprises a driver for driving a first load and a second load, wherein the driver comprises:
a dual-boost converter comprising:
an output capacitance comprising a first output capacitor connected in series with a second output capacitor;
a first switch connected to a power input stage via a first inductor and arranged for controlling charging of said first output capacitor via a first diode;
the first inductor and the first diode;
a second switch connected in series with said first switch and connected to the power input stage via a second inductor and arranged for controlling charging of said second output capacitor via a second diode;
the second inductor and the second diode;
wherein a center tap of said in series connected said first output capacitor and said second output capacitor is connected to a center tap of said in series connected said first switch and said second switch,
wherein the driver further comprises:
a first DC-DC converter arranged for converting a voltage present over said first output capacitor to a first output current for providing to the first load; and
a second DC-DC converter arranged for converting a voltage present over said second output capacitor to a second output current for providing to the second load, wherein the first DC-DC converter is connected across the first output capacitor and wherein the second DC-DC converter is connected across the second output capacitor.

12. The LED based lighting device in accordance with claim 11, wherein said first and said second load are LED based loads.

* * * * *